May 10, 1932. T. LAURENT 1,857,247
VOLTAGE MEASURING ARRANGEMENT
Filed Jan. 14, 1931
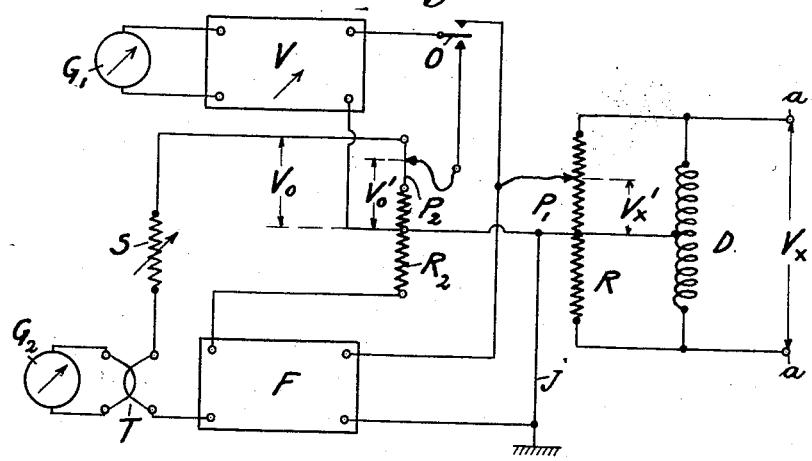
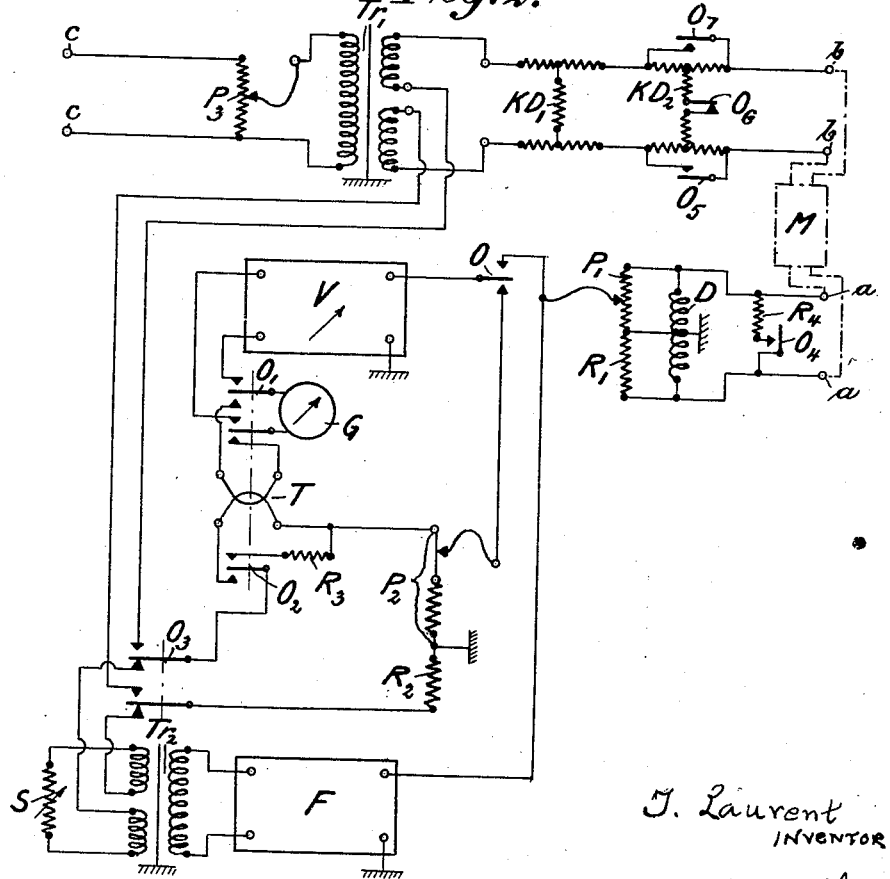
T. Laurent
INVENTOR Patented May 10, 1932

1,857,247

UNITED STATES PATENT OFFICE

TORBERN LAURENT, OF STOCKHOLM, SWEDEN, ASSIGNOR TO TELEFONAKTIEBOLAGET L. M. ERICSSON, OF STOCKHOLM, SWEDEN, A COMPANY OF SWEDEN

VOLTAGE MEASURING ARRANGEMENT

Application filed January 14, 1931, Serial No. 508,750, and in Sweden January 14, 1930.

The present invention relates to arrangements for comparative measurement of small alternating voltages. More particularly the invention relates to arrangements for transmission level measurements in telephone lines.

In telephone lines having repeaters it is necessary to be able to check the transmission level in different points in order to be able to determine the amplification ratio required at the various repeater stations. The measurement of the transmission level in a telephone line has hitherto been effected by sending out a current of a certain voltage (so called zero level) and of a certain frequency from one end of the line and then measuring the resultant voltage in different points along the line by comparison (calibration) with a local current source of the same frequency as the current sent out. Consequently the sending station must at every measurement communicate information with regard to the frequency that has been sent, in order that it shall be possible to adjust the various local oscillators for the same frequency. This system for measuring the transmission level is rather troublesome and the results obtained are not always accurate. The accuracy depends largely upon whether the two voltages to be compared have exactly the same frequency and curve form which in the method hitherto used is generally not the case. Errors may arise especially thereby, that at one or both current sources the two half periods are mutually different, different results being then obtained depending on which half periods are compared.

Corresponding errors of measurement are also met with in other measurements of a similar kind at which a voltmeter, preferably a valve voltmeter, is likewise connected alternately to the line or the like to be subjected to measurement and to a separate current source over a calibrating device, by way of example an adjustable artificial line or a potentiometer.

The above mentioned inconveniences are according to the present invention eliminated thereby, that the separate current source consists of an electron valve amplifier controlled by voltage from the object to be subjected to measurement. As the origin of the oscillations is the same in both cases frequency and curve form will be exactly alike. Hereby the measurement becomes more accurate and no information is required from the terminal station with regard to the frequency to be used for the measurements, which sometimes is a great advantage, especially if the line runs through several countries of different languages.

As mentioned above the accuracy of the measurements depends largely upon whether the two voltages to be compared have the same curve form or not. One feature of the present invention is that the voltmeter measures the same kind of half periods (either the positive or the negative) when connected to the object to be subjected to measurement as when connected to the separate current source over the calibrating device. This is of great importance as the positive and negative half periods may be of rather unequal form thus having a different influence on the measuring instruments. Another feature of the invention is that the voltage is tapped off from a resistance connected to the object to be subjected to measurement. For the purpose of preventing unsymmetrical currents from entering the measuring arrangement the resistance is shunted with an inductance coil, the middle point of which is connected to the middle point of the resistance, the desired voltage being tapped off between said middle point and a movable point on the resistance. The impedances of the resistance and of the inductance coil are so great that they do not appreciably load the object to be subjected to measurement. The arrangement is designed in such a way that it can conveniently be combined with arrangements for effecting other measurements.

The invention will be more closely described with reference to the accompanying drawings on which Figure 1 shows a circuit diagram for a measuring apparatus particularly adapted for transmission level measurements, and Figure 2 shows another embodiment of the invention adapted to be used also for loop attenuation measurements and amplification measurements.

The measuring arrangement shown in Figure 1 comprises two potentiometers $P_1$, $P_2$, an amplifier F and a valve voltmeter V. The potentiometer resistance $P_1$ is in series with an equally great resistance $R_1$ connected into circuit between the two input terminals $a$—$a$. An inductance coil D is connected into circuit in parallel with said resistances. The junction point between the two resistances $P_1$ and $R_1$ is by means of a grounded junction line $j$ connected to the middle point of the inductance coil D and further to one pole of the amplifier F, one pole of the potentiometer $P_2$ and one pole of the valve voltmeter V. The other pole of the valve voltmeter V may by means of a double throw switch O be alternately connected to the movable terminal of the potentiometer $P_2$ or to the movable terminal of the potentiometer $P_1$ and the other terminal of the amplifier F. To the secondary side of the amplifier a circuit is connected including a thermo-couple T, to which a galvanometer $G_2$ is connected, a variable resistance S, the potentiometer $P_2$ and a resistance $R_2$ connected in series with the latter. The junction point between the potentiometer $P_2$ and the resistance $R_2$ is connected to the grounded wire $j$. A galvanometer $G_1$ is connected to the valve voltmeter V.

The arrangement operates substantially in the following way.

The voltage $V_x$ to be measured, for instance the transmission level in a telephone line, is connected between the terminals $a$—$a$. The valve voltmeter V is by means of the double throw switch O connected to the potentiometer $P_1$, by means of which a certain voltage $V'_x$, corresponding to a certain deflection on the galvanometer $G_1$, is tapped off from the object to be subjected to measurement. This deflection may be adjusted more accurately by means of a regulating device on the valve voltmeter. By means of the variable resistance S the deflection on the galvanometer $G_2$ is adjusted to a certain value corresponding to a voltage $V_o$ over the entire potentiometer $P_2$. The valve voltmeter V is now connected over the double throw switch O to said potentiometer. The movable terminal of the potentiometer $P_2$ is then set in such a way that the deflection on the galvanometer $G_1$ obtains the same value as was obtained when the voltage was taken directly from the potentiometer $P_1$. The voltage over the potentiometer $P_2$ is then $V'_o = V'_x$. The two potentiometers are graduated in neper and it is assumed, that at the measurement $b$ neper has been read off the potentiometer $P_1$ and $d$ neper off the potentiometer $P_2$. The voltage at said two potentiometers is thus:

$$V'_x = V_x e^{-b} \text{ and } V'_o = V_o e^{d-k}$$

where $V_x$ is the voltage between the terminals $a$—$a$ and $k$ is a constant.

According to the above $$V_o e^{d-k} = V_x e^{-b}$$

and hence $$V_x = V_o e^{-k} e^{b+d}$$

As the quantities $V_o$, $k$, $b$ and $d$ are known $V_x$ may be determined. If one makes $V_o e^{-k} = 0.775$ volts, $(b+d)$ will be the transmission level expressed directly in neper.

In Figure 2 is shown a circuit diagram for an arrangement of substantially the same construction as the one described in connection with Figure 1, but which may also be used in resistance measurements and loop attenuation measurements.

For this purpose the transmission level meter is provided with an arrangement permitting the meter to be fed with alternating current from a separate current source. Said arrangement comprises a potentiometer $P_3$, a transformer $Tr_1$, two series-connected artificial lines or damping networks $KD_1$ and $KD_2$, of which the latter may be disconnected by means of the switches $O_5$, $O_6$ and $O_7$, and a double throw switch $O_3$ for connecting said arrangement to the measuring arrangement. Further a galvanometer G common to the two arrangements is arranged to be connected alternately to the valve voltmeter V or to the thermo-couple T by means of a double throw switch $O_1$. The double throw switch $O_1$ is mechanically connected with another double throw switch $O_2$ which, when the galvanometer is switched over from the thermo-couple T to the valve voltmeter V, simultaneously connects a resistance $R_3$ into circuit instead of the heating wire of the thermo-couple T. The resistance $R_3$ is equal to the resistance of the thermo-couple. In Figure 2 an output transformer $Tr_2$ for the amplifier F is also shown. When measuring the loop attenuation the object M to be subjected to measurement (by way of example a telephone line or the like connected in a loop) is connected between the terminals $a$—$a$ of the measuring arrangement and the terminals $b$—$b$ of the damping network $KD_2$. An alternating current source is connected to the terminals $c$—$c$ of the potentiometer $P_3$. The damping network $KD_2$ is disconnected by closing the switches $O_5$, $O_7$ and opening the switch $O_6$. The fixed damping network $KD_1$ is of small dimensions and serves only to damp possible currents reflected from the object subjected to measurement. In order to imitate the conditions in actual operation the object M to be subjected to measurement is loaded with a resistance $R_4$ by closing a switch $O_4$, said resistance being connected between the terminals $a-a$. After the double throw switch $O_3$ has been switched over in its upper position the loop attenuation measurements are carried out in the same manner as the transmission level measurements described above in connection with Figure 1. The valve voltmeter V is by means of the double throw switch O alternately connected to the potentiometers $P_1$ and $P_2$, the voltage transmitted directly from the transformer $Tr_1$ being thus compared with the voltage transmitted indirectly over the object M subjected to measurement. The amplification ratio of an amplifier is measured in a similar manner except that the damping network $KD_2$ is connected into circuit (by opening the switches $O_5$, $O_7$ and closing the switch $O_6$) in order to convert the negative attenuation of the amplifier to a positive attenuation that can be measured.

The above described arrangements are only intended to illustrate how the invention may be carried into effect and said arrangements may therefore be varied in different ways without departing from the idea of the invention.

I claim:—

1. A device for voltage measurements comprising in combination an amplifier for alternating currents, means for connecting the amplifier to the voltage to be measured, an adjustable damping device connected with its input side to the output side of the amplifier, means for adjusting the alternating potential supplied to the input side of the damping device, and means for comparing the voltage to be measured with the voltage on the output side of the damping device.

2. A device for voltage measurements comprising in combination an amplifier for alternating currents, means for connecting the amplifier to the voltage to be measured, an adjustable damping device connected with its input side to the output side of the amplifier, means for adjusting the alternating potential supplied to the input side of the damping device to a predetermined value, a voltmeter and means for applying the voltage to be measured and the output voltage of the adjustable damping device alternately to said voltmeter.

3. A device for voltage measurements comprising in combination an amplifier for alternating currents, means for connecting the amplifier to the voltage to be measured, an adjustable damping device connected with its input side to the output side of the amplifier, means for adjusting the alternating potential supplied to the input side of the damping device to a predetermined value, a voltmeter including a rectifier, and means for applying the voltage to be measured and the output voltage of the adjustable damping device alternately to said voltmeter in such a manner as to rectify semi-cycles of the same sign in both cases.

4. A device for voltage measurements comprising in combination a potentiometer adapted to be connected to the object to be subjected to measurement, an amplifier for alternating currents, means for connecting the amplifier to a pair of taps on the potentiometer, an adjustable damping device connected with its input side to the output side of the amplifier, means for adjusting the alternating potential supplied to the input side of the damping device, and means for comparing the voltage between said pair of taps with the voltage on the output side of the damping device.

5. A device for voltage measurements comprising in combination a potentiometer adapted to be connected to the object to be subjected to measurement, an induction coil shunted across the potentiometer and having its middle point connected to a middle point of the potentiometer, an amplifier for alternating currents, means for connecting the amplifier between said middle point and an adjustable tap of the potentiometer, an adjustable damping device connected with its input side to the output side of the amplifier, means for adjusting the alternating potential supplied to the input side of the damping device, and means for comparing the voltage between said taps of the potentiometer with the voltage on the output side of the damping device.

In testimony whereof I affix my signature.

TORBERN LAURENT.